Jan. 14, 1958    A. HAXTON    2,819,622
SPEED REDUCTION DEVICE
Filed July 2, 1956    3 Sheets-Sheet 1

INVENTOR.
ANDREW HAXTON.
BY Joseph R. Green
ATTORNEY

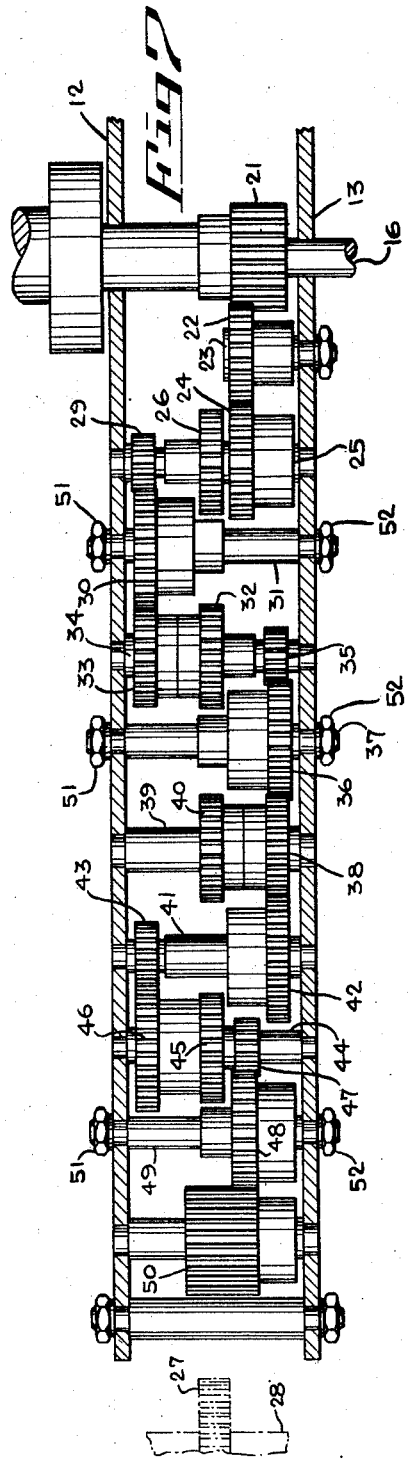
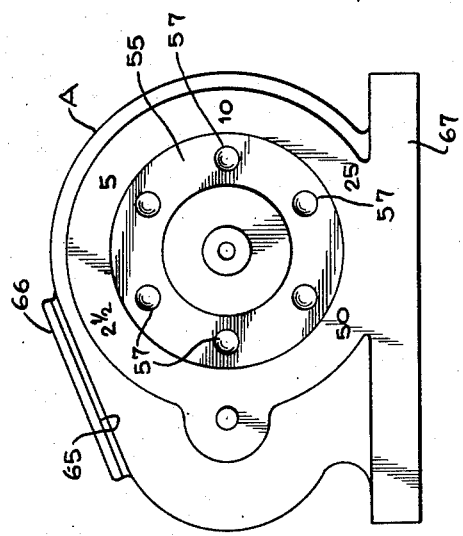

Jan. 14, 1958 — A. HAXTON — 2,819,622
SPEED REDUCTION DEVICE
Filed July 2, 1956 — 3 Sheets-Sheet 3

INVENTOR.
ANDREW HAXTON
BY Joseph R. Green
ATTORNEY

United States Patent Office 2,819,622
Patented Jan. 14, 1958

2,819,622

SPEED REDUCTION DEVICE

Andrew Haxton, Lynbrook, N. Y.

Application July 2, 1956, Serial No. 595,434

6 Claims. (Cl. 74—353)

This invention relates to speed changing units suitable for servo-mechanisms in which it is desired, for example, to operate a second device at a selected speed different from the speed at which a first device is operated.

In the form shown a finger piece is adapted to be turned to change the ratio between input and output speeds at will and a relatively strong spring detent is adapted to snap a ball into a depression and hold the changed connections at the newly set ratio.

In the form shown no axial shifting of gears is needed, and a single train of gears providing increasing rates of drive may be always in mesh with each other and with one gear which is always in mesh with the driving gear which provides the power. Various selected gears of the train may be brought into mesh with the final output gear so as to drive it by shorter or longer portions of the train and thus vary the rate of drive very rapidly and with a small number of meshed gears.

It has been found possible to drive at a trivial load such a train of gears providing five speeds in addition to neutral, with ball bearings for all the turning parts, and it has also been found possible to eliminate substantially all perceptible backlash, with reductions of speed as great as fifty to one.

Thus all axial shifting of gears or of spines has been eliminated, clashing becomes impossible, and quiet reliable operation becomes normal, eliminating wear and tear and providing a reliable gear system for servo-mechanisms or so-called automation installations, even where manual speed changes are at times desirable.

The present invention avoids the need for any gears other than standard forms of spur gears, besides avoiding all slidable gears and all need for splines.

Moreover, due to the circular arrangement of the gear train, when a new gear is swung into mesh with a turning or an idle gear, it approaches it on a curved line thus eliminating the head-on meeting of gear teeth and consequent clashing.

It is well adapted to serve as a tool for first pass study of many servo and control problems.

Other features and advantages will hereinafter appear.

In the accompanying drawings:

Fig. 4 is a side view like Fig. 1 with a cover removed to show detent depressions;

Fig. 7 is a diagrammatic plan view of the parts seen from the side as developed to lie along the broken angular line 7—7 of Fig. 5 and with the output gear diagrammatically shown at the left in line with the delivery gears.

Figure 1:
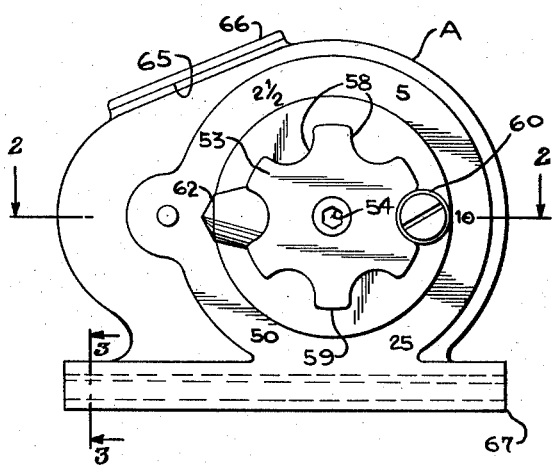
Fig. 1 is a side elevation of the exterior of one form of the device.
Figure 2:
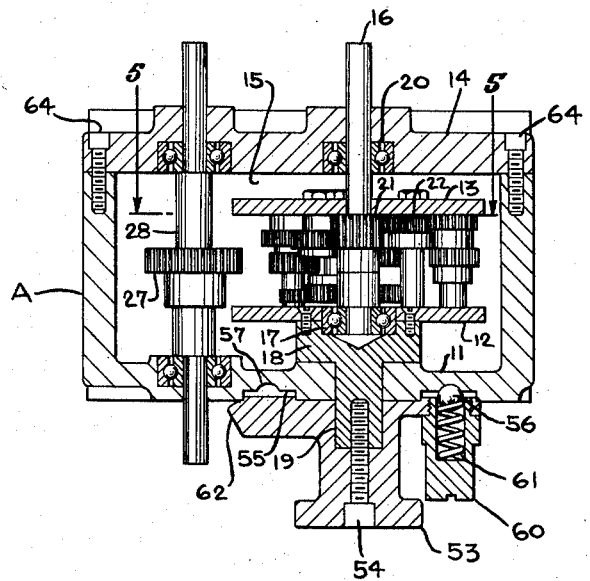
Fig. 2 is a sectional view taken along the section line 2—2 of Fig. 1.
Figure 3:
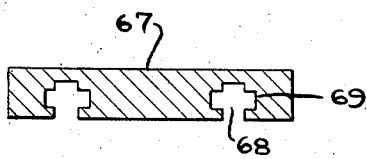
Fig. 3 is a sectional view taken along the line 3—3 of Fig. 1.

The device shown has proved satisfactory when three inches high with input and output shafts an inch and one half above the base and with an overall length of three and seven eighths inches.

The housing described below may be cast aluminum and the shafts and precision gears made of stainless steel.

In the form shown a cylindrical casing A having a roughly eggshaped cross-section, carries on the internal flat face 11 a flat plate 12 which carries the change speed train of gears.

This train of gears is carried by journals and bolts which also support a second flat plate 13 spaced from the plate 12 so that a cover plate 14 covering the open side 15 of the cylinder 10 may be removed without disturbing the train of gears.

The projecting input drive shaft 16 for the train of gears is shown as journalled in a ball bearing 17 carried by a yoke 18 with a neck 19 projecting through the face 11. The input shaft 16 is shown as passing through the flat plate 13 and the cover plate 14 and further journalled in a ball bearing 20 in the cover plate 14.

In the form shown the input shaft 16 carries a gear 21 forming the first gear in the above mentioned train and this gear 21 is constantly in mesh with the idler gear 22 shown in Fig. 7 as carried on a stub shaft 23.

The idler gear is constantly in mesh with a gear 24 carried on a shaft 25, see Fig. 7, said shaft 25 also carrying the first delivery gear 26, which may be carried around to mesh with the output gear 27 on the projecting shaft 28 and turn the output gear 27 slower than the input gear 21. In the form shown the output shaft turns more slowly than the input shaft in a ratio of 1 to 2½. Other ratios, as will be described below, such as 50 to 1, 25 to 1, 10 to 1, 5 to 1, or even 0 to 1 (or neutral), may be selected.

The shaft 25 also carries a smaller gear 29, forming part of the aforesaid gear train and meshing with an idler 30 on a fixed shaft 31 and driving a second delivery gear 32 because the idler 30 meshes with a drive gear 33 fastened to the shaft 34 of the second delivery gear 32.

The second delivery gear 32 is adapted to be carried around and mesh with the output gear 27 and then selectively turn it while the shaft 16 turns, and the ratio of gears shown is such that the output shaft 28 turns slower than the input shaft 16 in the ratio of 5 to 1.

The means for swinging the gear 26 together with the gear 32 together with other gears will be described below.

The shaft 34 also carries a smaller gear 35 meshing with a larger idler gear 36 on a fixed shaft 37 which drives a gear 38 on a shaft 39 carrying a third delivery gear 40 also adapted to be swung with the other gears until that gear meshes with the output gear 27.

Then the gear 40 turns the output shaft slower at a ratio of 10 to 1 because of the small size of gear 35.

The gear 38 likewise serves to turn an idler shaft 41 carrying a large gear 42 meshing with the gear 38 and a second small gear 43 which drives the shaft 44 of the next delivery gear 45. That delivery gear 45, like the delivery gears 26, 32, and 40, is adapted to be swung to mesh with the output gear 27, and to turn the output shaft 28 in the large ratio of 25 to 1.

For that reason the small gear 43 meshes with a gear 46 on the shaft 44 which is materially larger than the delivery gear 45 on that shaft The shaft 44 also carries a small gear 47 meshing with a large idler gear 48 on the fixed shaft 49 and that idler gear 48 meshes with a final delivery gear 50 also adapted to be swung into mesh with the output gear 27 and turn it in a ratio of 50 to 1.

In the form shown the delivery gear 50 is broad faced so that it meshes properly with the output gear 27 and also is broad enough to mesh with the idler gear 48, although that gear is out of the line of the other delivery gears 26, 32, and 40 and 45.

It will be seen from diagrammatic plan Fig. 7, that all the delivery gears 26, 32, 40, and 45 lie in the same plane as the output gear 27. For clearness the output gear 27 is shown at the left of those delivery gears in that figure and in a line with them and with the delivery side of delivery gear 50.

It will be noted that the fixed shafts, 31, 37, and 49 are shown as shouldered bolts in Fig. 7, carrying nuts 51 and 52 threaded on each end to hold the plates 12 and 13.

It should be here stated that the journals shown in Fig. 7 are shown only diagrammatically, and that in some commercial products, each journal takes the form of a ball bearing. As a result starting torque with no load on the output shaft has been found to be ½ inch ounce at the reduction ratio of 2½ to 1. At the reduction ratio 50 to 1 starting torque was found to be one inch ounce with no load on the output shaft.

The connections for manually carrying the delivery gears one after another to the output gear 27 include the flat plates 12 and 13 which are easily turned on the shaft 16 as a center by turning a finger piece 53 fastened to the neck 19 and held to it by a threaded screw 54.

Figure 6:
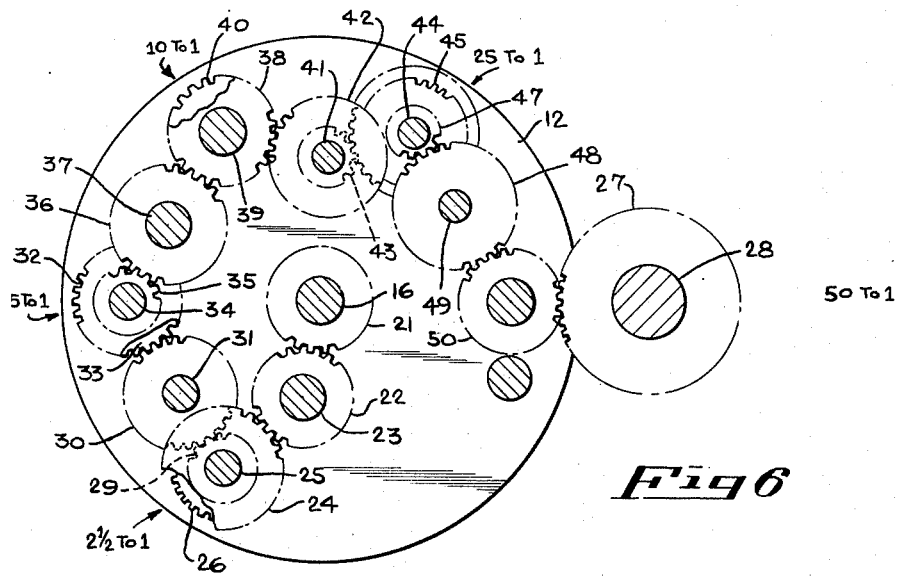
Fig. 6 is a similar view showing the parts at a ratio of 50 to 1.
Figure 5:
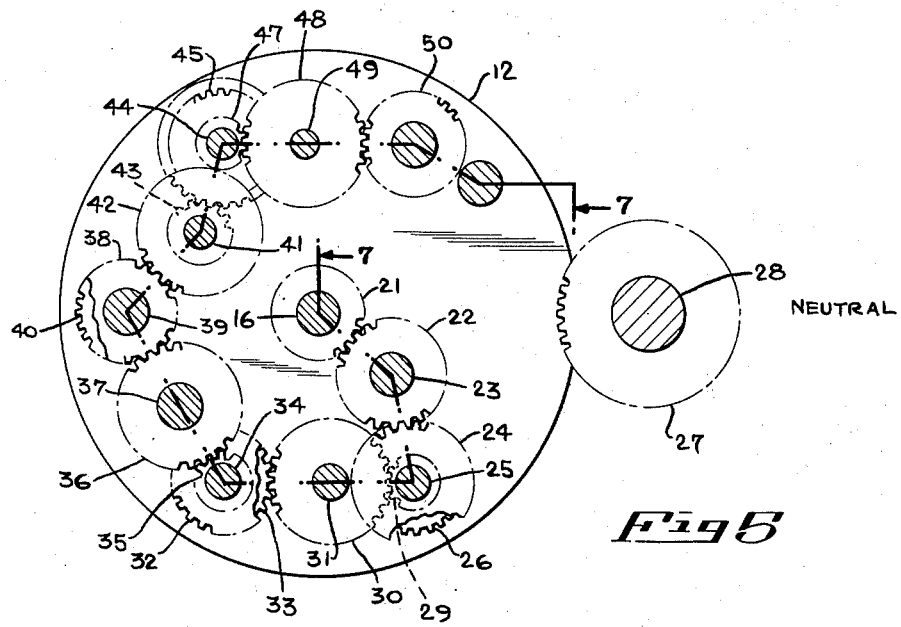
Fig. 5 is a sectional top view on the broken line 5—5 of Fig. 2 showing the parts at neutral.

To facilitate the holding of the delivery gears 26, 32, 40, 45, and 50 in mesh with output gear 26, the neck 19 carries a spread flat plate 54 which overlies the outside 55 of the plate 11 and includes a relatively strong spring pressed detent ball 56, and this ball 56 seats itself in any of six relatively deep depressions 57 in the face 55. Thus the ball seats itself in one of these depressions 57 whenever the delivery gears 26, 32, 40, 45, and 50 are all out of mesh with the output gear 27, as in Fig. 7 or whenever one of said delivery gears 26, 32, 40, 45, or 50 is in mesh with said output gear 27, as seen for gear 50 in Fig. 6.

To further hold the gears in mesh as just described the finger piece 53 may be formed with depressions 58 forming teeth 59 between them which roughly tend to hold the finger piece 53 at the point the detent tends to hold it, because the teeth tend to bear against the housing 60 of the detent spring 61.

A pointer 62 carried by the finger piece 53 points to any one of engraved digits indicating reduction ratios 2½, 5, 10, 25, and 50 which may be placed in mesh at any time simply by manually turning the finger piece. To eliminate the cost of a clutch or the inconvenience of dismounting the unit at least one neutral station is provided.

In the form shown the hollow oval-shaped casing 63 holds the side cover plate 14 by screws 64 and leaves an access top opening 65 which may be covered by a removable transparent closure 66.

The frame of the device usually includes an integral cast flat base 67 provided with T slots 68 so that captive nuts in cross slots 69 may be provided when shipped out, to make the process of mounting and meshing the output gear with another gear, a simpler one.

Thus, speed reductions to any of several selected ratios may be quickly and easily made while the unit is running simply by manually turning a finger piece to any of several selected positions.

Having thus described one embodiment of the invention, what is claimed is:

1. In a speed change gear device, the combination with an input shaft, of an output shaft, a single spur gear fast to the output shaft for driving it, a single train of spur gears driven by the input shaft having gears of varied sizes to vary speeds and including spaced driving gears in the plane of the output shaft gear and idler gears between the said spaced driving gears for spacing the same, and means for successively bringing gears in said plane into mesh with the output shaft gear and out of mesh with the output shaft gear selectively.

2. In a speed change gear device, the combination with an input shaft, of an output shaft, a single spur gear fast to the output shaft for driving it, a single train of compound spur gears driven by the input shaft having gears of varied sizes to vary speeds and including spaced driving gears in the plane of the output shaft gear and idler gears between the said spaced driving gears for spacing the same, and means journalled on the input shaft for successively bringing gears in said plane into mesh with the output shaft gear and out of mesh with the output shaft gear selectively.

3. In a speed change gear device, the combination with an input shaft, of an output shaft, a single spur gear fast to the output shaft for driving it, a single train of spur gears of successive reductions and including spaced driving gears in the plane of the output shaft gear and idler gears between the said spaced driving gears for spacing the same, and means for meshing different gears in said plane with the output shaft gear to drive it at varied ratios and at neutral.

4. In a speed change gear device, the combination with an input shaft, of an output shaft, a single spur gear fast to the output shaft for driving it, a single train of spur gears of successive reductions and including spaced driving gears in the plane of the output shaft gear and idler gears between the said spaced driving gears for spacing the same, and swinging means for meshing different gears in said plane with the output shaft gear to drive it at varied ratios and avoid gear clashing.

5. The combination with a projecting input shaft, of a projecting output shaft parallel to but spaced from the input shaft, an output gear on the output shaft for driving it, a train of gears in the plane of the output gear having spaced gears adapted to mesh with and turn the output gear and idler gears between the said spaced gears for spacing the same, and a support for the gear train adapted to turn on the input shaft to selectively cause the meshing gears to mesh with the output gear.

6. In combination in a speed change gear device adapted to drive an output gear mounted on an output shaft at selectively variable speeds including zero speed, an input shaft parallel to the output shaft and spaced therefrom, an input gear mounted on the input shaft, a single train of continuously engaged gears driven by the input gear and including spaced driving gears movable with the said train successively into mesh with the output gear and spacing idler gears between successive driving gears, and a support for the gear train adapted to turn on the input shaft to cause the spaced driving gears to come selectively into and out of mesh with the output gear.

References Cited in the file of this patent
UNITED STATES PATENTS

| | | |
|---|---|---|
| 812,888 | Shannon | Feb. 20, 1906 |
| 2,642,756 | Cummings | June 23, 1953 |
| 2,775,904 | Edwards | Jan. 1, 1957 |